(12) United States Patent
Nguyen

(10) Patent No.: US 7,156,194 B2
(45) Date of Patent: Jan. 2, 2007

(54) METHODS OF DRILLING AND CONSOLIDATING SUBTERRANEAN FORMATION PARTICULATE

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 136 days.

(21) Appl. No.: 10/650,065

(22) Filed: Aug. 26, 2003

(65) Prior Publication Data

US 2005/0045384 A1 Mar. 3, 2005

(51) Int. Cl.
*C09K 8/02* (2006.01)
(52) U.S. Cl. .......................... 175/72; 166/295
(58) Field of Classification Search ............. 166/295; 175/64, 65, 70, 72; 507/117, 220
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | 260/78.3 |
| 2,869,642 A | 1/1959 | McKay et al. | |
| 3,047,067 A | 7/1962 | Williams et al. | |
| 3,123,138 A | 3/1964 | Robichaux | |
| 3,176,768 A | 4/1965 | Brandt et al. | |
| 3,199,590 A | 8/1965 | Young | |
| 3,272,650 A | 9/1966 | MacVittie | 134/7 |
| 3,297,086 A | 1/1967 | Spain | |
| 3,308,885 A | 3/1967 | Sandiford | |
| 3,316,965 A | 5/1967 | Watanabe | |
| 3,375,872 A | 4/1968 | McLaughlin et al. | |
| 3,404,735 A | 10/1968 | Young et al. | |
| 3,415,320 A | 12/1968 | Young | |
| 3,492,147 A | 1/1970 | Young et al. | 117/62.2 |
| 3,659,651 A | 5/1972 | Graham | |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | |
| 4,029,148 A | 6/1977 | Emery | 166/250.1 |
| 4,031,958 A | 6/1977 | Sandiford et al. | |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |

(Continued)

FOREIGN PATENT DOCUMENTS

CA 2063877 5/2003

(Continued)

OTHER PUBLICATIONS

Halliburton, *CoalStim*[SM] *Service, Helps Boost Cash Flow From CBM Assets*, Stimulation, HO3679 10/03, 2003, Halliburton Communications.

(Continued)

*Primary Examiner*—Zakiya W. Bates
(74) *Attorney, Agent, or Firm*—Robert A. Kent; Baker Botts

(57) ABSTRACT

Improved methods for drilling well bores penetrating producing zones while controlling formation particulates are provided. Some embodiments provide methods of drilling a well bore into a subterranean formation comprising the steps of providing a drilling composition comprising a drilling fluid and a consolidating material; and, using the drilling composition while drilling the well bore and allowing the consolidating material in the drilling composition to penetrate into the walls of the well bore.

18 Claims, No Drawings

U.S. PATENT DOCUMENTS

| | | | |
|---|---|---|---|
| 4,564,459 A | 1/1986 | Underdown et al. ... | 252/8.55 R |
| 4,572,803 A | 2/1986 | Yamazoe et al. ............. | 534/16 |
| 4,649,998 A | 3/1987 | Friedman .................... | 166/294 |
| 4,664,819 A | 5/1987 | Glaze et al. .............. | 252/8.551 |
| 4,665,988 A | 5/1987 | Murphey et al. ........... | 166/295 |
| 4,669,543 A | 6/1987 | Young ...................... | 166/276 |
| 4,675,140 A | 6/1987 | Sparks et al. ............... | 264/4.3 |
| 4,683,954 A | 8/1987 | Walker et al. .............. | 166/307 |
| 4,694,905 A | 9/1987 | Armbruster ................. | 166/280 |
| 4,715,967 A | 12/1987 | Bellis ...................... | 252/8.551 |
| 4,716,964 A | 1/1988 | Erbstoesser et al. ........ | 166/284 |
| 4,733,729 A | 3/1988 | Copeland .................... | 166/276 |
| 4,739,832 A | 4/1988 | Jennings, Jr. et al. ....... | 166/299 |
| 4,785,884 A | 11/1988 | Armbruster ................. | 166/280 |
| 4,787,453 A | 11/1988 | Hewgill et al. .......... | 166/272.3 |
| 4,789,105 A | 12/1988 | Hosokawa et al. ........... | 241/67 |
| 4,796,701 A | 1/1989 | Hudson et al. ............. | 166/278 |
| 4,797,262 A | 1/1989 | Dewitz ...................... | 422/142 |
| 4,800,960 A | 1/1989 | Friedman et al. ........... | 166/276 |
| 4,809,783 A | 3/1989 | Hollenbeck et al. ........ | 166/307 |
| 4,817,721 A | 4/1989 | Pober ....................... | 166/295 |
| 4,829,100 A | 5/1989 | Murphey et al. ........... | 523/131 |
| 4,838,352 A | 6/1989 | Oberste-Padtberg et al. ......................... | 166/291 |
| 4,842,072 A | 6/1989 | Friedman et al. ........... | 166/295 |
| 4,843,118 A | 6/1989 | Lai et al. ..................... | 524/555 |
| 4,848,467 A | 7/1989 | Cantu et al. ................ | 166/281 |
| 4,848,470 A | 7/1989 | Korpics ...................... | 166/312 |
| 4,850,430 A | 7/1989 | Copeland et al. ........... | 166/276 |
| 4,886,354 A | 12/1989 | Welch et al. ................. | 356/70 |
| 4,888,240 A | 12/1989 | Graham et al. ............. | 428/403 |
| 4,895,207 A | 1/1990 | Friedman et al. ........... | 166/276 |
| 4,903,770 A | 2/1990 | Friedman et al. ........... | 166/288 |
| 4,934,456 A | 6/1990 | Moradi-Araghi ............ | 166/270 |
| 4,936,385 A | 6/1990 | Weaver et al. .............. | 166/288 |
| 4,942,186 A | 7/1990 | Murphey et al. ........... | 523/131 |
| 4,957,165 A | 9/1990 | Cantu et al. ................ | 166/295 |
| 4,959,432 A | 9/1990 | Fan et al. .................... | 526/287 |
| 4,961,466 A | 10/1990 | Himes et al. ............... | 166/250 |
| 4,969,522 A | 11/1990 | Whitehurst et al. ......... | 166/278 |
| 4,969,523 A | 11/1990 | Martin et al. ............... | 166/278 |
| 4,986,353 A | 1/1991 | Clark et al. ................. | 166/279 |
| 4,986,354 A | 1/1991 | Cantu et al. ................ | 166/279 |
| 4,986,355 A | 1/1991 | Casad et al. ................ | 166/295 |
| 5,030,603 A | 7/1991 | Rumpf et al. ............... | 501/127 |
| 5,049,743 A | 9/1991 | Taylor, III et al. .......... | 250/303 |
| 5,082,056 A | 1/1992 | Tackett, Jr. ................. | 166/295 |
| 5,107,928 A | 4/1992 | Hilterhaus .................. | 166/293 |
| 5,128,390 A | 7/1992 | Murphey et al. ........... | 523/130 |
| 5,135,051 A | 8/1992 | Fracteau et al. ............. | 166/104 |
| 5,142,023 A | 8/1992 | Gruber et al. ............... | 528/354 |
| 5,165,438 A | 11/1992 | Fracteau et al. ............... | 137/1 |
| 5,173,527 A | 12/1992 | Calve .......................... | 524/74 |
| 5,178,218 A | 1/1993 | Dees ........................... | 166/281 |
| 5,182,051 A | 1/1993 | Bandy et al. ................ | 252/645 |
| 5,199,491 A | 4/1993 | Kutts et al. ................. | 166/276 |
| 5,199,492 A | 4/1993 | Surles et al. ................ | 166/295 |
| 5,211,234 A | 5/1993 | Floyd ......................... | 166/276 |
| 5,216,050 A | 6/1993 | Sinclair ....................... | 524/108 |
| 5,218,038 A | 6/1993 | Johnson et al. ............. | 524/541 |
| 5,232,955 A | 8/1993 | Caabai et al. ................ | 521/63 |
| 5,232,961 A | 8/1993 | Murphey et al. ........... | 523/414 |
| 5,238,068 A | 8/1993 | Fredickson ................. | 166/307 |
| 5,247,059 A | 9/1993 | Gruber et al. ............... | 528/354 |
| 5,249,628 A | 10/1993 | Surjaatmadja .............. | 166/305 |
| 5,256,729 A | 10/1993 | Kutts et al. ................. | 524/700 |
| 5,273,115 A | 12/1993 | Spafford ..................... | 166/281 |
| 5,285,849 A | 2/1994 | Surles et al. ................ | 166/295 |
| 5,293,939 A | 3/1994 | Surles et al. ................ | 166/295 |
| 5,295,542 A | 3/1994 | Cole et al. ................... | 166/278 |
| 5,320,171 A | 6/1994 | Laramay ..................... | 166/285 |
| 5,321,062 A | 6/1994 | Landrum et al. ............ | 523/141 |
| 5,325,923 A | 7/1994 | Surjaatmadja et al. ...... | 166/308 |
| 5,330,005 A | 7/1994 | Card et al. .................. | 166/280 |
| 5,332,037 A | 7/1994 | Schmidt et al. ............. | 166/276 |
| 5,335,726 A | 8/1994 | Rodrogues .................. | 166/295 |
| 5,351,754 A | 10/1994 | Hardin et al. ............... | 166/249 |
| 5,358,051 A | 10/1994 | Rodrigues ................... | 166/295 |
| 5,359,026 A | 10/1994 | Gruber ....................... | 528/354 |
| 5,360,068 A | 11/1994 | Sprunt et al. ............... | 166/259 |
| 5,361,856 A | 11/1994 | Surjaatmadja et al. ........ | 175/67 |
| 5,363,916 A | 11/1994 | Himes et al. ............... | 166/276 |
| 5,373,901 A | 12/1994 | Norman et al. ............. | 166/300 |
| 5,377,759 A | 1/1995 | Surles | |
| 5,381,864 A | 1/1995 | Nguyen et al. ............. | 166/280 |
| 5,386,874 A | 2/1995 | Laramay et al. ............ | 166/300 |
| 5,388,648 A | 2/1995 | Jordan, Jr. .................. | 166/380 |
| 5,393,810 A | 2/1995 | Harris et al. ................. | 524/56 |
| 5,396,957 A | 3/1995 | Surjaatmadja et al. ...... | 166/308 |
| 5,402,846 A | 4/1995 | Jennings, Jr. et al. ....... | 166/259 |
| 5,422,183 A | 6/1995 | Sinclair et al. ............. | 428/403 |
| 5,423,381 A | 6/1995 | Surles et al. ................ | 166/295 |
| 5,439,055 A | 8/1995 | Card et al. .................. | 166/280 |
| 5,460,226 A | 10/1995 | Lawton et al. .............. | 166/300 |
| 5,464,060 A | 11/1995 | Hale et al. .................. | 166/293 |
| 5,475,080 A | 12/1995 | Gruber et al. ............... | 528/354 |
| 5,484,881 A | 1/1996 | Gruber et al. ................ | 528/54 |
| 5,492,178 A | 2/1996 | Nguyen et al. ............. | 166/276 |
| 5,494,103 A | 2/1996 | Surjaatmadja et al. ...... | 166/222 |
| 5,497,830 A | 3/1996 | Boles et al. ................. | 166/300 |
| 5,498,280 A | 3/1996 | Fistner et al. ................. | 106/19 |
| 5,499,678 A | 3/1996 | Surjaatmadja et al. ...... | 166/298 |
| 5,501,275 A | 3/1996 | Card et al. .................. | 166/280 |
| 5,505,787 A | 4/1996 | Yamaguchi .................... | 134/4 |
| 5,512,071 A | 4/1996 | Yam et al. .................... | 51/307 |
| 5,520,250 A | 5/1996 | Harry et al. ................. | 166/278 |
| 5,522,460 A | 6/1996 | Shu ............................. | 166/295 |
| 5,529,123 A | 6/1996 | Carpenter et al. ........... | 166/293 |
| 5,531,274 A | 7/1996 | Bienvenu, Jr. .............. | 166/280 |
| 5,536,807 A | 7/1996 | Gruber et al. ............... | 528/354 |
| 5,545,824 A | 8/1996 | Stengel et al. .............. | 524/590 |
| 5,547,023 A | 8/1996 | McDaniel et al. .......... | 166/280 |
| 5,551,513 A | 9/1996 | Suries et al. ................ | 166/278 |
| 5,551,514 A | 9/1996 | Nelson et al. | |
| 5,582,249 A | 12/1996 | Caveny et al. .............. | 166/276 |
| 5,582,250 A | 12/1996 | Constein .................... | 166/280 |
| 5,588,488 A | 12/1996 | Vijn et al. ................... | 166/293 |
| 5,591,700 A | 1/1997 | Harris et al. ................. | 507/204 |
| 5,594,095 A | 1/1997 | Gruber et al. ............... | 528/354 |
| 5,595,245 A | 1/1997 | Scott, III .................. | 166/250.1 |
| 5,597,784 A | 1/1997 | Sinclair et al. ............. | 507/219 |
| 5,604,184 A | 2/1997 | Ellis et al. ................... | 507/117 |
| 5,604,186 A | 2/1997 | Hunt et al. .................. | 507/204 |
| 5,609,207 A | 3/1997 | Dewprashad et al. ....... | 166/276 |
| 5,620,049 A | 4/1997 | Gipson et al. ............... | 166/248 |
| 5,639,806 A | 6/1997 | Johnson et al. ............. | 523/208 |
| 5,670,473 A | 9/1997 | Scepanski ................... | 510/445 |
| 5,692,566 A | 12/1997 | Surles | |
| 5,697,440 A | 12/1997 | Weaver et al. .............. | 166/281 |
| 5,698,322 A | 12/1997 | Tsai et al. ................... | 428/373 |
| 5,712,314 A | 1/1998 | Surles et al. ................. | 521/41 |
| 5,732,364 A | 3/1998 | Kalb et al. ..................... | 588/8 |
| 5,765,642 A | 6/1998 | Surjaatmadja .............. | 166/297 |
| 5,775,425 A | 7/1998 | Weaver et al. .............. | 166/276 |
| 5,782,300 A | 7/1998 | James et al. ................ | 166/278 |
| 5,783,822 A | 7/1998 | Buchanan et al. .......... | 250/259 |
| 5,787,986 A | 8/1998 | Weaver et al. .............. | 166/280 |
| 5,791,415 A | 8/1998 | Nguyen et al. ............. | 166/280 |
| 5,799,734 A | 9/1998 | Norman et al. ............. | 166/278 |
| 5,806,593 A | 9/1998 | Suries ........................ | 166/270 |
| 5,830,987 A | 11/1998 | Smith ........................ | 528/332 |
| 5,833,000 A | 11/1998 | Weaver et al. .............. | 166/276 |
| 5,833,361 A | 11/1998 | Funk ........................... | 366/80 |
| 5,836,391 A | 11/1998 | Jonasson et al. ............ | 166/295 |

| Patent | Date | Inventor | Class |
|---|---|---|---|
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A * | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B1 | 12/2001 | Chatterji et al. | 166/295 |
| 6,350,309 B1 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B1 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B1 | 12/2002 | Brothers et al. | 106/692 |
| 6,494,263 B1 | 12/2002 | Todd | 166/312 |
| 6,503,870 B1 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B1 | 4/2003 | Chatterji et al. | 507/219 |
| 6,569,814 B1 | 5/2003 | Brady et al. | 507/201 |
| 6,582,819 B1 | 6/2003 | McDaniel et al. | 428/402 |
| 6,593,402 B1 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |

| | | | |
|---|---|---|---|
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1 | 5/2005 | Nguyen et al. | 507/221 |
| 6,978,295 B1 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1* | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen | |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1107584 | 3/1968 |
| GB | 1 264 180 | 2/1972 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.

Halliburton Technical Flier—Multi Stage Frac Completion Methods, 2 pages, undated.

Halliburton "CobraFrac$^{SM}$ Service, Coiled Tubing Fracturing—Cost-Effective Method for Stimulating Untapped Reserves", 2 pages, 2004.

Halliburton "CobraJetFrac$^{SM}$ Service, Cost-Effective Technology That Can Help Reduce Cost per BOE Produced, Shorten Cycle time and Reduce Capex", undated.

Halliburton Cobra Frac Advertisement, 2001.

Halliburton "SurgiFrac$^{SM}$ Service, a Quick and cost-Effective Method to Help Boost Production From Openhole Horizontal Completions", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, 2001.

Gorman, *Plastic Electric: Lining up the Future of Conducting Polymers* Science News, vol. 163, May 17, 2003.

Gidley et al., "*Recent Advances in Hydraulic Fracturing,*" Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch.12, pp. 147-159, 2001.

Cantu et al., "*Laboratory and Field Evaluation of a Combined Fluid-Loss Control Additive and Gel Breaker for Fracturing Fluids,*" SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Albertsson et al.,"*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795), undated.

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, "*What is Coalbed Methane?*" CDX, LLC. Available @ www.cdxgas.com/what.html, printed p. 1, undated.

Halliburton brochure entitled "H2Zero™ Service Introducing The Next Generation of cost-Effective Conformance Control Solutions", 2002.

Halliburton brochure entitled INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages, undated.

* cited by examiner

METHODS OF DRILLING AND
CONSOLIDATING SUBTERRANEAN
FORMATION PARTICULATE

FIELD OF THE INVENTION

The present invention describes improved methods for drilling and treating well bores. More particularly, the present invention relates to improved methods for drilling well bores penetrating producing zones while controlling formation particulates.

DESCRIPTION OF THE PRIOR ART

Often, well bores are drilled into weakly consolidated formations wherein the walls of the well bore may be sensitive to degradation by the force of mobile fluids within the formation. Often, such well bores are subjected to some form of sand control operation such as gravel packing to reduce the migration of unconsolidated formation particulates. One common gravel packing operation involves placing a gravel pack screen in the well bore and packing the surrounding annulus between the screen and the well bore with particulates referred to as "gravel" that have a specific size designed to prevent the passage of formation sand. The gravel pack screen is generally a filter assembly used, inter alia, to support and retain the gravel placed during gravel pack operations. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. While gravel packs have been successfully used to control the migration of formation sands, their placement generally reduces the available diameter of a well bore due to the physical size of the screen and the resulting gravel annulus.

The screen assembly referred to in the gravel packing operation may also be used as an independent sand control means. Some of the early screen technology dictated that the screens had to be small enough to pass through the smallest diameter of the well bore on the way to its desired placement location where the diameter of the well bore may actually be larger. Developments in technology have lead to deformable and expandable screens such that a relatively small size or small diameter screen may be placed in a desired location along the well bore and then expanded to accommodate the actual size of the well bore at the point of placement.

While the sand control methods mentioned above are routinely used in the completion of well bores, particularly those drilled into weakly consolidated formations, they increase the expense of installing a well bore by requiring separate steps to drill the well bore and then to control the formation sands.

SUMMARY OF THE INVENTION

The present invention describes improved methods for drilling and treating well bores. More particularly, the present invention relates to improved methods for drilling well bores penetrating producing zones while controlling formation particulates.

Some embodiments of the present invention provide methods of drilling a well bore into a subterranean formation comprising the steps of providing a drilling composition comprising a drilling fluid and a consolidating material; and, using the drilling composition while drilling the well bore and allowing the consolidating material in the drilling composition to penetrate into the walls of the well bore.

Other embodiments of the present invention provide methods of consolidating a subterranean formation surrounding a well bore comprising the steps of providing a drilling composition comprising a drilling fluid and a consolidating material; and, using the drilling composition while drilling the well bore and allowing the consolidating material in the drilling composition to penetrate into the walls of the well bore as it is formed.

Other and further objects, features and advantages of the present invention will be readily apparent to those skilled in the art upon a reading of the description of preferred embodiments which follows.

DESCRIPTION OF PREFERRED
EMBODIMENTS

The present invention describes improved methods for drilling and treating well bores. More particularly, the present invention relates to improved methods for drilling well bores penetrating producing zones while controlling formation particulates.

In some embodiments of the methods of the present invention, a well bore is drilled with a drilling composition comprising a drilling fluid and a consolidating material. The consolidating material is allowed to penetrate into the formation and substantially cure, thus consolidating the formation sands along the wall of the well bore. The methods of the present invention provide, inter alia, a means for stabilizing weakly consolidated formations surrounding a well bore during drilling, preventing the formation from collapsing during production, and producing through the treated interval.

Drilling fluids suitable or use in the present invention may be water-based fluids or oil-based invert emulsion fluids. Essentially any drilling fluid suitable for a drilling application may be used in accordance with the present invention, including aqueous gels, emulsions, and other suitable fluids. Suitable aqueous gels are generally comprised of water and one or more gelling agents and may further comprise weighting agents. Suitable emulsions may be comprised of two immiscible liquids such as an aqueous gelled liquid and a liquefied, normally gaseous fluid, such as nitrogen. In some embodiments of the present invention where the well bore is drilled into a producing zone, the drilling fluid may comprise a drill-in fluid, which is a fluid designed specifically for drilling through the reservoir section of a well bore. Drill-in fluids are often used, inter alia, to minimize damage and maximize production of exposed zones and to facilitate later well completion procedures. Often, additives essential for fluid loss control and cuttings carrying are present in a drill-in fluid. It is within the ability of one skilled in the art, with the benefit of this disclosure, to select a drilling fluid suitable for use in the drilling compositions of the present invention.

Traditional drilling operations add solid particulate matter to the drilling fluid to help control fluid loss to the surrounding formation. In the methods of the present invention, use of such additives can be greatly reduced or eliminated due to the fact that the consolidation material added to the drilling fluid may act as a fluid loss control agent. Thus, drilling compositions suitable for use in the present invention preferably comprise only a small amount of particulate fluid loss control material. In some embodiments of the present invention, particularly in those applications where the formation being drilled has a low permeability, e.g. a chalk formation, the drilling fluid composition may contain little if any particulate fluid loss control material. In other embodiments of the present invention, a fluid loss control material is present in the drilling fluid composition in an amount ranging from 0.1% to about 10% by weight of the overall drilling fluid composition. When used, the particulate fluid loss control material is preferably a material that will degrade in the well bore. Suitable such degradable fluid loss control material's include, but are not limited to, aliphatic polyesters, polylactic acid, poly(lactides), poly (orthoesters) and combinations thereof.

Consolidation materials suitable for use in the present invention include, but are not limited to, low-temperature epoxy-based resins, furan-based resins, phenolic-based resins, high-temperature (HT) epoxy-based resins, and phenol/phenol formaldehyde/furfuryl alcohol resins.

The temperature of the subterranean formation being drilled may affect selection of a consolidation material. By way of example, for subterranean formations exhibiting a temperature ranging from about 60° F. to about 250° F., low-temperature epoxy-based resins comprising a hardenable resin component and a hardening agent component containing specific hardening agents may be preferred. For subterranean formations exhibiting a temperature ranging from about 300° F. to about 600° F., a furan-based resin may be preferred. For subterranean formations exhibiting a temperature ranging from about 200° F. to about 400° F., either a phenolic-based resin or a HT epoxy-based resin may be suitable. For subterranean formations exhibiting a temperature of at least about 175° F., a phenol/phenol formaldehyde/furfuryl alcohol resin may also be suitable.

One consolidation material suitable for use in the methods of the present invention is a low-temperature epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions, e.g. a low enough viscosity to permeate into the formation being drilled. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resins, polyepoxide resins, novolak resins, polyester resins, phenol-aldehyde resins, urea-aldehyde resins, furan resins, urethane resins, glycidyl ethers and mixtures thereof. The resin utilized is included in the liquid hardenable resin component in an amount sufficient to consolidate the coated particulates. In some embodiments of the present invention, the resin utilized is included in the liquid hardenable resin component in the range of from about 70% to about 100% by weight of the liquid hardenable resin component.

Any solvent that is compatible with the hardenable resin and achieves the desired viscosity effect is suitable for use in the present invention. Preferred solvents are those having high flash points (most preferably about 125° F.) because of, inter alia, environmental factors. As described above, use of a solvent in the hardenable resin composition is optional but may be desirable to reduce the viscosity of the hardenable resin component for a variety of reasons including ease of handling, mixing, and transferring. It is within the ability of one skilled in the art with the benefit of this disclosure to determine if and how much solvent is needed to achieve a suitable viscosity. Solvents suitable for use in the present invention include, but are not limited to, butylglycidyl ethers, dipropylene glycol methyl ethers, dipropylene glycol dimethyl ethers, dimethyl formamides, diethyleneglycol methyl ethers, ethyleneglycol butyl ethers, diethyleneglycol butyl ethers, propylene carbonates, methanols, butyl alcohols, d'limonene and fatty acid methyl esters.

Examples of the hardening agents that can be utilized in the liquid hardening agent component of the low-temperature epoxy-based resins include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4-diaminodiphenyl sulfone may be a suitable hardening agent. The hardening agent utilized is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component.

The silane coupling agent may be used, inter alia, to act as a mediator to help bond the resin to the formation particulate surfaces. Examples of silane coupling agents that can be utilized in the liquid hardening agent component of the low-temperature epoxy-based resins include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. The silane coupling agent used is included in the liquid hardening agent component in an amount capable of sufficiently bonding the resin to the formation particulates. In some embodiments of the present invention, the silane coupling agent used is included in the liquid hardenable resin component in the range of from about 0.1% to about 3% by weight of the liquid hardening agent component.

Any surfactant compatible with the liquid hardening agent may be used with the low-temperature epoxy-based resins. Such surfactants include, but are not limited to, ethoxylated nonyl phenol phosphate esters, mixtures of one or more cationic surfactants, and one or more non-ionic surfactants and alkyl phosphonate surfactants. The mixtures of one or more cationic and nonionic surfactants are described in U.S. Pat. No. 6,311,773, the relevant disclosure of which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component.

A diluent or liquid carrier fluid in the hardenable resin composition may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. The liquid carrier fluids that can be utilized in the liquid hardening agent component low-temperature epoxy-based resins preferably include those having high flash points (most preferably above about 125° F.). Examples of liquid carrier fluids suitable for use in the present invention include, but are not limited to, dipropylene glycol methyl ethers, dipropylene glycol dimethyl ethers, dimethyl formamides, diethyleneglycol methyl ethers, ethyleneglycol butyl ethers, diethyleneglycol butyl ethers, propylene carbonates, d'limonene and fatty acid methyl esters.

Another consolidation material suitable for use in the methods of the present invention is a furan-based resin. Suitable furan-based resins include, but are not limited to, furfuryl alcohol resins, mixtures furfuryl alcohol resins and aldehydes, and a mixture of furan resins and phenolic resins. A furan-based resin may be combined with a solvent to control viscosity, if desired. Suitable solvents for use in the furan-based consolidation fluids of the present invention include, but are not limited to 2-butoxy ethanol, butyl acetate, and furfuryl acetate.

Another consolidation material suitable for use in the methods of the present invention is a phenolic-based resin. Suitable phenolic-based resins include, but are not limited to, terpolymers of phenol, phenolic formaldehyde resins, and a mixture of phenolic and furan resins. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol.

Another consolidation material suitable for use in the methods of the present invention is a HT epoxy-based resin. Suitable HT epoxy-based components include, but are not limited to, bisphenol A-epichlorohydrin resins, polyepoxide resins, novolac resins, polyester resins, glycidyl ethers and mixtures thereof. An HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide, dimethyl formamide, dipropylene glycol methyl ether, dipropylene glycol dimethyl ether, diethylene glycol methyl ether, ethylene glycol butyl ether, diethylene glycol butyl ether, propylene carbonate, d'limonene, and fatty acid methyl esters.

Yet another consolidation material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant. Suitable solvents for use with phenol/phenol formaldehyde/furfuryl alcohol resins include, but are not limited to, 2-butoxy ethanol, butyl acetate, furfuryl acetate, and combinations thereof.

Regardless of the consolidation material chosen, its viscosity should preferably be controlled to ensure that it is able to sufficiently penetrate the subterranean formation. A preferred depth of treatment may be from about one to about three well bore diameters; however, the laminate and/or non-uniform makeup of the formation, i.e. shale-sandstone-shale-sandstone, etc., may make reaching such a depth unrealistic. In some embodiments of the present invention, the consolidation fluid penetrates at least about 0.5 inches into the walls of the well bore.

One embodiment of a method of the present invention provides a method of drilling a well bore with a drilling composition comprising a drilling fluid component and a consolidating material component, and allowing the consolidating material to penetrate into the walls of the well bore.

Another embodiment of a method of the present invention provides a method of consolidating a subterranean formation surrounding a well bore comprising the steps of drilling a well bore with a drilling composition comprising a drilling fluid component and a consolidating material component, and allowing the consolidating material to penetrate into the subterranean formation surrounding the well bore.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of drilling a well bore comprising the steps of:
   providing a drilling composition comprising a drilling fluid and a consolidating material, the consolidating material comprising
   a hardenable resin component that comprises a hardenable resin, and a liquid hardening agent component that comprises a hardening agent, a silane coupling agent, and a surfactant; and using the drilling composition to drill at least a portion of the well bore and allowing the consolidating material in the drilling composition to penetrate into the walls of the well bore.

2. The method of claim 1 wherein the consolidating material has a viscosity of less than about 100 cP.

3. The method of claim 1 wherein the hardenable resin in the hardenable resin component is an organic resin selected from the group consisting of bisphenol A-epichlorohydrin resins, polyepoxide resins, novolak resins, polyester resins, phenol-aldehyde resins, urea-aldehyde resins, furan resins, urethane resins, glycidyl ethers, and mixtures thereof.

4. The method of claim 1 wherein the hardening agent in the liquid hardening agent component is selected from the group consisting of amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

5. The method of claim 1 wherein the silane coupling agent in the liquid hardening agent component is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane and mixtures thereof.

6. The method of claim 1 wherein the surfactant in the liquid hardening agent component is selected from the group consisting of ethoxylated nonyl phenol phosphate esters, mixtures of one or more cationic surfactants, $C_{12}$–$C_{22}$ alkyl phosphonate surfactants, mixtures of one or more non-ionic surfactants and alkyl phosphonate surfactants, and mixtures thereof.

7. The method of claim 1 wherein the hardenable resin is a furan-based resin is selected from the group consisting of furfuryl alcohol, mixtures of furfuryl alcohol with aldehydes, mixtures of furan resin and phenolic resin, and mixtures thereof.

8. The method of claim 1 wherein the hardenable resin component further comprises a solvent selected from the group consisting of 2-butoxy ethanol, butyl acetate, furfuryl acetate, and mixtures thereof.

9. The method of claim 1 wherein the consolidating material further comprises a phenolic-based resin selected from the group consisting of terpolymers of phenol, phenolic formaldehyde resin, mixtures of phenolic and furan resin, and mixtures thereof.

10. The method of claim 9 wherein the consolidating material further comprises a solvent selected from the group consisting of butyl acetate, butyl lactate, furfuryl acetate, 2-butoxy ethanol, and mixtures thereof.

11. The method of claim 1 wherein the consolidating material further comprises a HT epoxy-based resin selected from the group consisting of bisphenol A-epichlorohydrin resins, polyepoxide resins, novolac resins, polyester resins, glycidyl ethers, and mixtures thereof.

12. The method of claim 11 wherein the consolidating material further comprises a solvent selected from the group consisting of dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene, fatty acid methyl esters, and mixtures thereof.

13. The method of claim 1 wherein the consolidating material comprises:

from about 5% to about 30% phenol;

from about 40% to about 70% phenol formaldehyde;

from about 10 to about 40% furfuryl alcohol;

from about 0.1% to about 3% of a silane coupling agent; and from about 1% to about 15% of a surfactant.

14. The method of claim 13 wherein the consolidating material further comprises a solvent selected from the group consisting of 2-butoxy ethanol, butyl acetate, furfuryl acetate, and combinations thereof.

15. The method of claim 1 wherein the fluid component of the drilling fluid is an aqueous gel or an emulsion.

16. The method of claim 1 wherein the consolidating material penetrates into the walls of the well bore from about 0.1 to about 3 inches.

17. The method of claim 1 wherein the drilling composition further comprises a fluid loss control material.

18. The method of claim 17 wherein the fluid loss control material is selected from the group consisting of aliphatic polyesters, polylactic acid, poly(lactides), and combinations thereof.

* * * * *